United States Patent [19]
Adachi et al.

[11] Patent Number: 5,548,425
[45] Date of Patent: Aug. 20, 1996

[54] REFLECTIVE LCD HAVING A RESIN-DIFFUSER WITH DISPERSED METAL OXIDE PARTICLES BETWEEN A SUBSTRATE AND PIXEL ELECTRODES OR INTEGRAL WITH THE PIXEL ELECTRODES

[75] Inventors: Masahiro Adachi, Nara; Shinji Shimada, Kashihara, both of Japan

[73] Assignee: Sharp Kabushiki Kaisha, Osaka, Japan

[21] Appl. No.: 277,109

[22] Filed: Jul. 20, 1994

[30] Foreign Application Priority Data

Jul. 21, 1993 [JP] Japan .................................. 5-180490

[51] Int. Cl.⁶ .............................................. G02F 1/1335
[52] U.S. Cl. ................................. 359/69; 359/70
[58] Field of Search ............................ 359/69, 70, 68, 359/71, 59

[56] References Cited

U.S. PATENT DOCUMENTS

| | | | |
|---|---|---|---|
| 4,106,859 | 8/1978 | Doriguzzi et al. | 359/69 |
| 4,249,801 | 2/1981 | Masubuchi | 359/69 |
| 4,415,236 | 11/1983 | Perregaux | 359/70 |
| 4,470,666 | 9/1984 | Eick | 359/68 |
| 4,519,679 | 5/1985 | Horikiri et al. | 359/68 |
| 4,648,691 | 3/1987 | Oguchi et al. | 359/70 |
| 4,904,060 | 2/1990 | Grupp | 359/69 |
| 5,193,017 | 3/1993 | Iwai et al. | 359/59 |

FOREIGN PATENT DOCUMENTS

| | | | |
|---|---|---|---|
| 0019208 | 11/1980 | European Pat. Off. | 359/70 |
| 55-84975 | 6/1980 | Japan | 359/70 |
| 62-231219 | 10/1987 | Japan | 359/69 |
| 4-116503 | 4/1992 | Japan | 359/69 |
| 4-267220 | 9/1992 | Japan . | |

OTHER PUBLICATIONS

"Late-News Paper: Bright Reflective Multicolor LCDs Addressed By a—SI TFTs" Mitsui et al., SID 92 Digest, pp. 437–440.

"Liquid Crystal Device Handbook", Japan Society for the Promotion of Science, Committee 142, pp. 324–327.

*Primary Examiner*—Anita Pellman Gross
*Assistant Examiner*—Toan Ton

[57] ABSTRACT

A reflective type display apparatus having a plurality of pixels includes: a first substrate; a second substrate provided in parallel to the first substrate, the second substrate being transparent to external light; a plurality of transparent pixel electrodes formed on the first substrate; a transparent counter electrode layer formed on the second substrate; a light modulating layer for modulating the external light in accordance with voltages between the plurality of transparent pixel electrodes and the transparent counter electrode, the light modulating layer being interposed between the plurality of transparent pixel electrodes and the transparent counter electrode; wherein a light scattering layer in which fine particles are dispersed in a matrix is interposed between the plurality of transparent pixel electrodes and the first substrate, the light scattering layer scatters the external light.

18 Claims, 8 Drawing Sheets

REFLECTIVE LCD HAVING A RESIN-DIFFUSER WITH DISPERSED METAL OXIDE PARTICLES BETWEEN A SUBSTRATE AND PIXEL ELECTRODES OR INTEGRAL WITH THE PIXEL ELECTRODES

BACKGROUND OF THE INVENTION

1. Field of the Invention

The present invention relates to a reflective type display apparatus which is capable of performing display in color.

2. Description of the Related Art

In recent years, liquid crystal displays have been widely used as a flat display in view of its small size and light weight. Among others, a reflective type liquid crystal display apparatus, which does not require a back light system, has been attracting attention due to its low power consumption. An example of such a reflective type liquid crystal display apparatus is a TFT-LCD (Thin-Film Transistor-Liquid Crystal Display) reported on P.437 in the Proceeding of the SID (Society of Information Display) 92.

Figure 8:
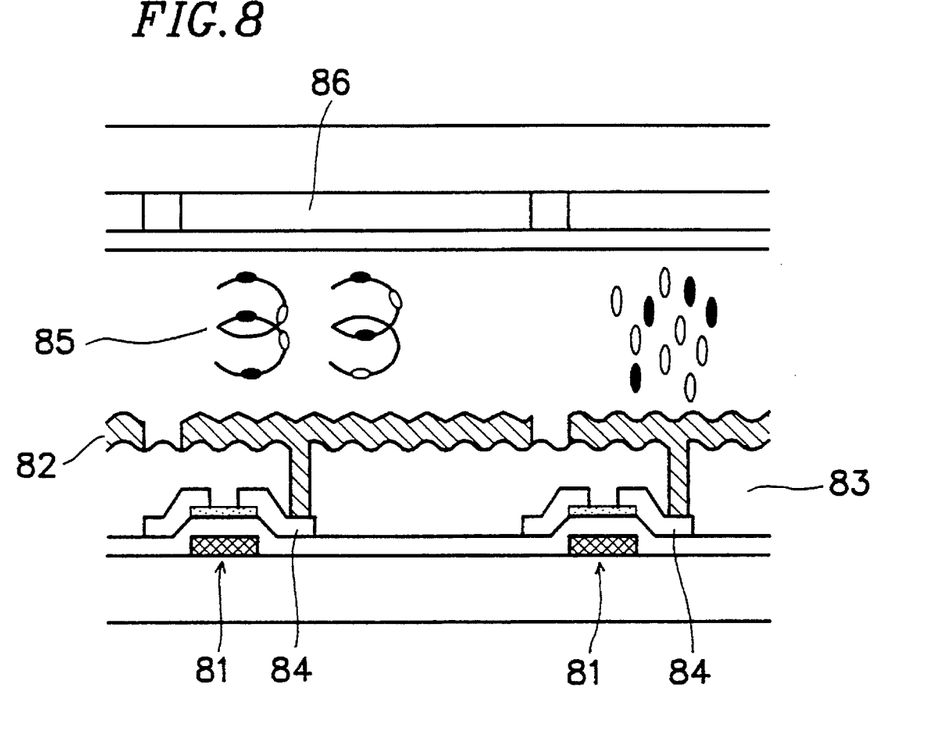
FIG. 8 shows a cross sectional view illustrating a conventional reflective type liquid crystal display apparatus.

As shown in FIG. 8, the above-described TFT-LCD has a structure in which a drain electrode 84 of a TFT 81 and a pixel electrode 82 made of aluminum (Al) connected to each other through an interlayer insulating film (passivation film) 83. The pixel electrode 82 functions as a reflector having concavities and convexities corresponding to concavities and convexities formed on the surface of the interlayer insulating film 83. The light reflected by the reflector (the pixel electrode 82) is modulated by a guesthost type liquid crystal 85 containing dichroic dyes, and forms a color image through color filters 86.

Figure 9:
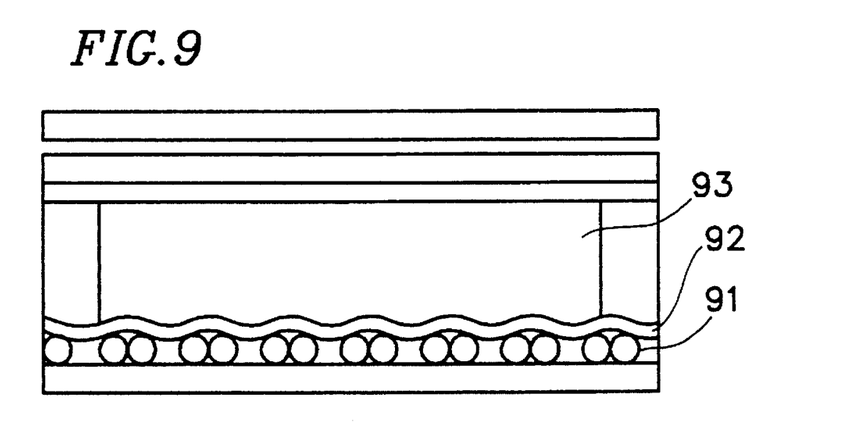
FIG. 9 shows a cross sectional view illustrating a conventional reflective type liquid crystal display apparatus.

Japanese Laid-Open Patent Publication No. 4-267220 discloses a reflective electro-optic apparatus as shown in FIG. 9. In this apparatus, concavities and convexities 91 are formed with an organic film in which fine particles are dispersed, and a metal layer 92 is formed thereon as a reflective layer. The reflected light from the metal layer 92 is modulated by a guest-host type liquid crystal 93 to display an image.

According to the TFT-LCD of FIG. 8, the fabrication steps are complex and the fabrication cost is expensive, since the concavities and convexities should be formed on the interlayer insulating film 83. Moreover, it is difficult to control a photolithography step in order that the concavities and convexities are formed on the interlayer insulating film 83 with a good reproducibility. Furthermore, since it is difficult to form very small concavities and convexities, the size of which is in the order of a micrometer, an excellent reflection characteristic can not be obtained.

According to the apparatus of FIG. 9, relatively small concavities and convexities 91 are easily formed by dispersing the fine particles in the organic film. However, since the reflection from the surface of the metal layer 92 induces a glare problem and makes it difficult to obtain excellent white display. In addition, color display, which will have a great demand in the near future, is not considered in this apparatus.

SUMMARY OF THE INVENTION

The reflective type display apparatus having a plurality of pixels of this invention, includes: a first substrate; a second substrate provided in parallel to from the first substrate, the second substrate being transparent to external light; a plurality of transparent pixel electrodes formed on the first substrate; a transparent counter electrode layer formed on the second substrate; a light modulating layer for modulating the external light in accordance with voltages between the plurality of transparent pixel electrodes and the transparent counter electrode, the light modulating layer being interposed between the plurality of transparent pixel electrodes and the transparent counter electrode; wherein a light scattering layer in which fine particles are dispersed in a matrix is interposed between the plurality of transparent pixel electrodes and the first substrate, the light scattering layer scatters the external light.

According to another aspect of the invention, a reflective type display apparatus having a plurality of pixels includes: a first substrate; a second substrate provided in parallel to the first substrate, the second substrate being transparent to external light; a plurality of pixel electrodes formed on the first substrate; a transparent counter electrode layer formed on the second substrate; a light modulating layer for modulating the external light in accordance with voltages between the plurality of transparent pixel electrodes and the transparent counter electrode, the light modulating layer being interposed between the plurality of transparent pixel electrodes and the transparent counter electrode; wherein each of the plurality of pixel electrodes includes a light scattering layer in which fine particles are dispersed in a matrix, the light scattering layer scatters the external light.

In one embodiment of the invention, the light scattering layer is colored for each of the plurality of pixels.

In another embodiment of the invention, each of colored regions of the light scattering layer includes red regions, green regions or blue regions, and the red regions, the green regions and the blue regions are arranged regularly.

In another embodiment of the invention, each of the fine particles is made of material selected from a group of aluminum oxide, silicon oxide, titanium oxide, manganese oxide, zirconium oxide, zinc oxide, magnesium fluoride and fluorite.

In another embodiment of the invention, the matrix of the light scattering layer includes a polymer selected from a group of polyamide, polyimide, polyester, acrylic resin, epoxy resin, and polyvinylalcohol.

In another embodiment of the invention, the thickness of the light scattering layer is in a range from 1000 angstroms to 10 μm.

In another embodiment of the invention, the reflective type display apparatus further includes a metal reflector layer between the light scattering layer and the first substrate.

In another embodiment of the invention, the light scattering layer is dyed by dyeing at least one of the fine particles and the matrix of the light scattering layer.

In another embodiment of the invention, the light modulating layer includes a liquid crystal containing dichroic pigments.

In the present invention, a pair of substrates are provided with a light modulating layer interposed therebetween. One of the pair of the substrates is referred to as a first substrate and the other is referred to as a second substrate. A transparent electrode is formed on the second substrate. A light scattering layer in which fine particles are dispersed is formed on the first substrate, and another transparent electrode is formed thereon. The external light from the side of the second substrate is scattered by the light scattering layer to form an image. Since the scattered light caused by the light scattering layer does not glare like light reflected from a metal layer, excellent white display can be obtained. If especially strong reflection light is desired, a reflector made of a metal may be formed on the first substrate, and the light scattering layer may be formed on the reflector.

Since the light scattering layer can be formed by a spin coating, the fabrication cost can be lowered. Because very small concavities and convexities in the order of a micro meter can be formed by dispersing fine particles in a matrix, the method according to the invention can improve the reflection characteristic.

By dispersing fine particles containing a conductive material in the matrix, the light scattering layer can be also used as a pixel electrode.

By dyeing the matrix or the fine particles, the light scattering layer can be colored, and thereby, color images can be produced.

Thus, the invention described herein makes possible the advantage of providing a reflective type display apparatus which has an excellent reflection characteristic, attains color and non-glaring white display, and can be produced economically in simple fabrication steps.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples, with reference to the accompanying drawings.

The invention is described in connection with a TFT-LCD. For simplicity, description of elements which are not related directly to the invention, such as a supplemental capacitor and a bus line for the supplemental capacitor, are omitted.

EXAMPLE 1

In a reflective type display apparatus of Example 1, first and second insulating substrates made of a glass or the like sandwich a liquid crystal layer (light modulating layer). Incident external light from the side of the second substrate is scattered by a light scattering layer formed on the first substrate so as to form an image.

Figure 1A:
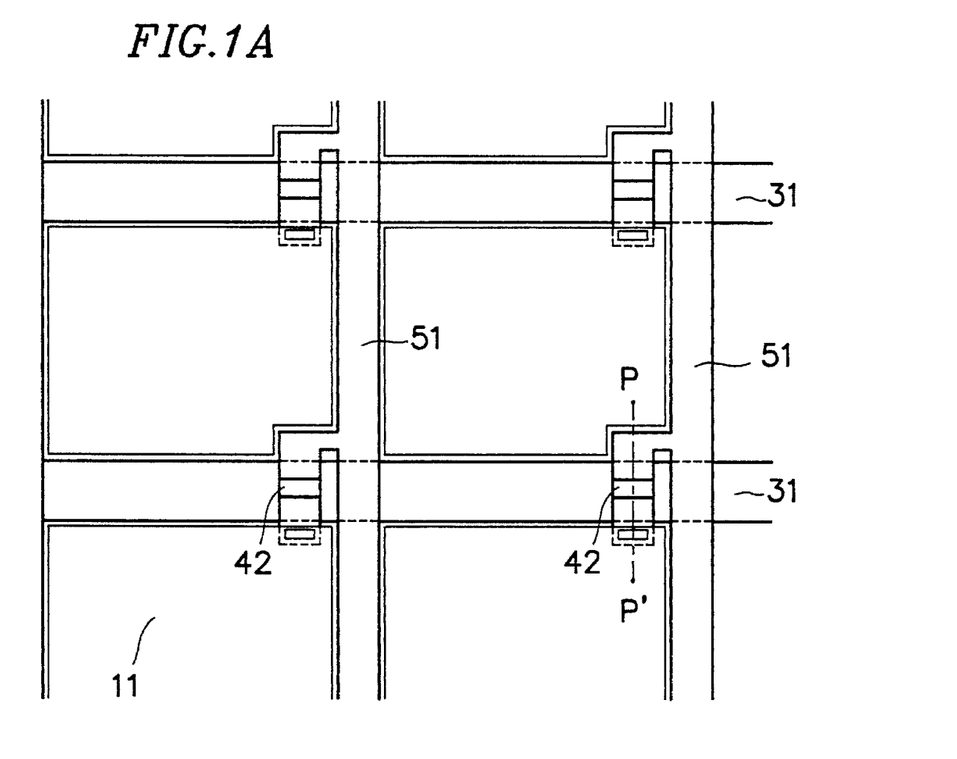
FIG. 1A shows a plane view of a reflective type display apparatus of Example 1.

In the first substrate, as shown in FIG. 1A, a plurality of scanning electrode lines 31 made of tantalum or the like are provided in parallel to each other on an insulating substrate 30 made of glass or the like. A plurality of signal electrode lines 51 are provided in parallel to each other so as to intersect the scanning electrode lines 31. TFTs are formed on the intersections of the scanning electrode lines 31 and the signal electrode lines 51.

Figure 1B:
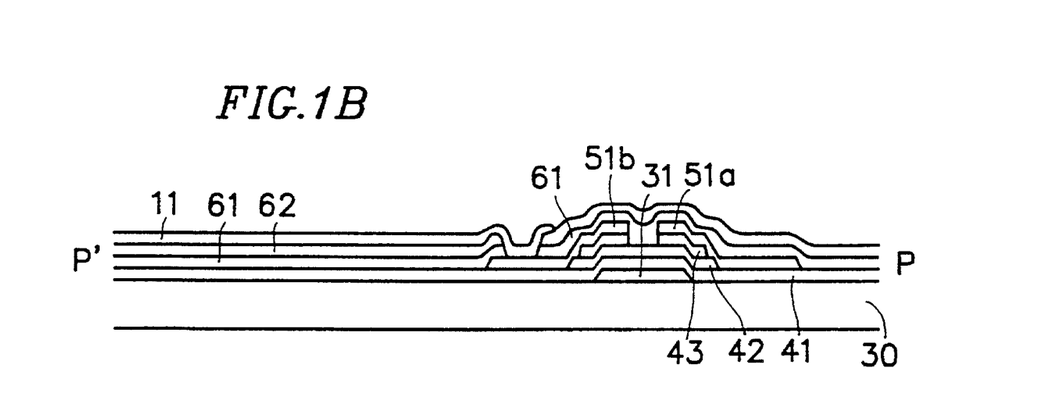
FIG. 1B shows a cross sectional view taken along line P–P' in FIG. 1A.

As shown in FIG. 1B, a gate insulating film 41 made of silicon nitride or the like is formed on the scanning electrode line 31 so as to cover almost the entire substrate. Non-doped amorphous silicon film 42 is formed on the gate insulating film 41 so as to be positioned over the scanning electrode line 31 at the TFT portions. Separated contact layers 43 made of an $n^+$ amorphous silicon film are formed on the amorphous silicon film 42. A signal electrode 51a made of titanium or the like is formed on one of the contact layers 43 and connected to the signal electrode line 51. A drain electrode 51b made of titanium or the like is formed on the other contact layer 43.

A passivation film 61 made of silicon nitride or the like is formed so as to cover almost the entire surface of the substrate 30, and a light scattering layer 62 is formed on the passivation film 61. A transparent pixel electrode 11 made of ITO (Indium Tin Oxide) or the like is formed on the light scattering layer 62, and connected to the drain electrode 51b via a contact hole formed through the passivation film 61 and the light scattering layer 62. An alignment film (not shown) is further formed thereon.

A transparent counter electrode made of ITO or the like is formed on the second substrate provided, and an alignment film is formed thereon.

Next, the fabrication method of the reflective type display apparatus is described with reference to FIGS. 3A through 6B.

Figure 3A:
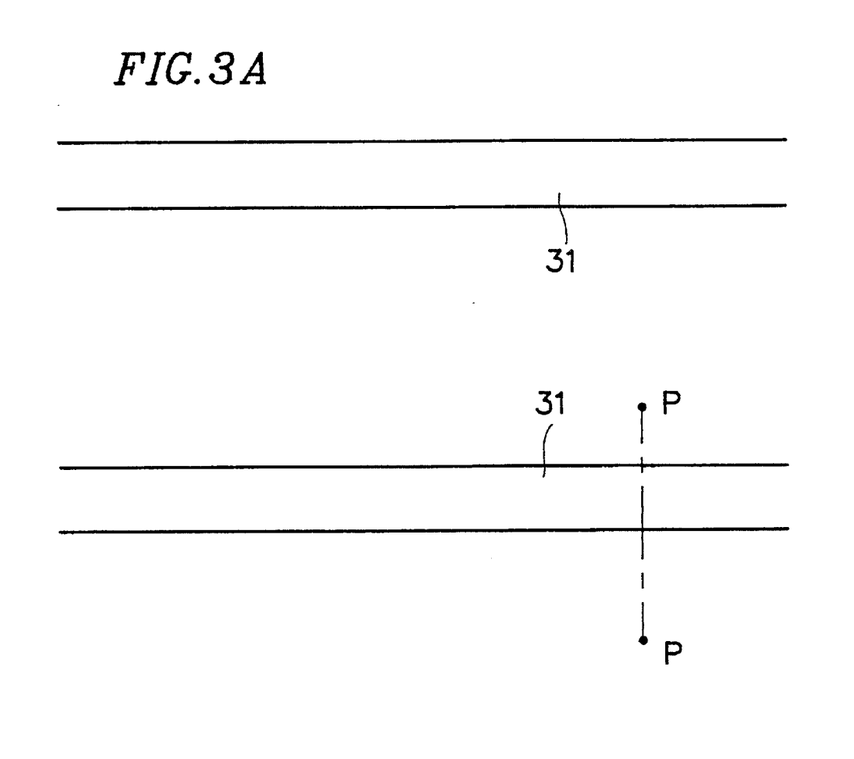
FIG. 3A shows plane views illustrating a fabrication step of the reflective type display apparatus of Example 1.
Figure 3B:
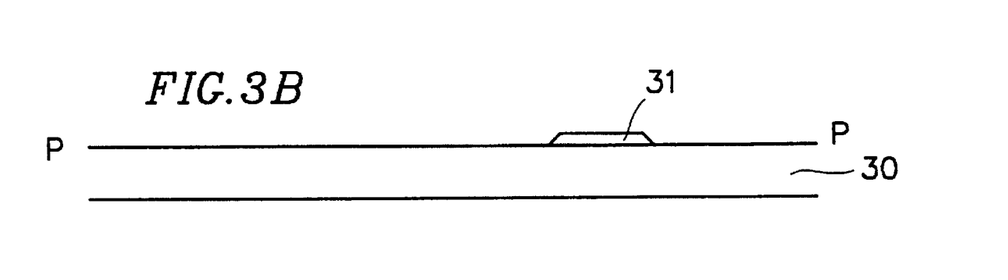
FIG. 3B shows a cross sectional view taken along line P–P' in FIG. 3A.

First, a tantalum film is formed on the glass substrate 30 by a sputtering method, and the titanium film is patterned by a photolithography technique to form the scanning electrode lines 31, as shown in FIGS. 3A and 3B.

Figure 4A:
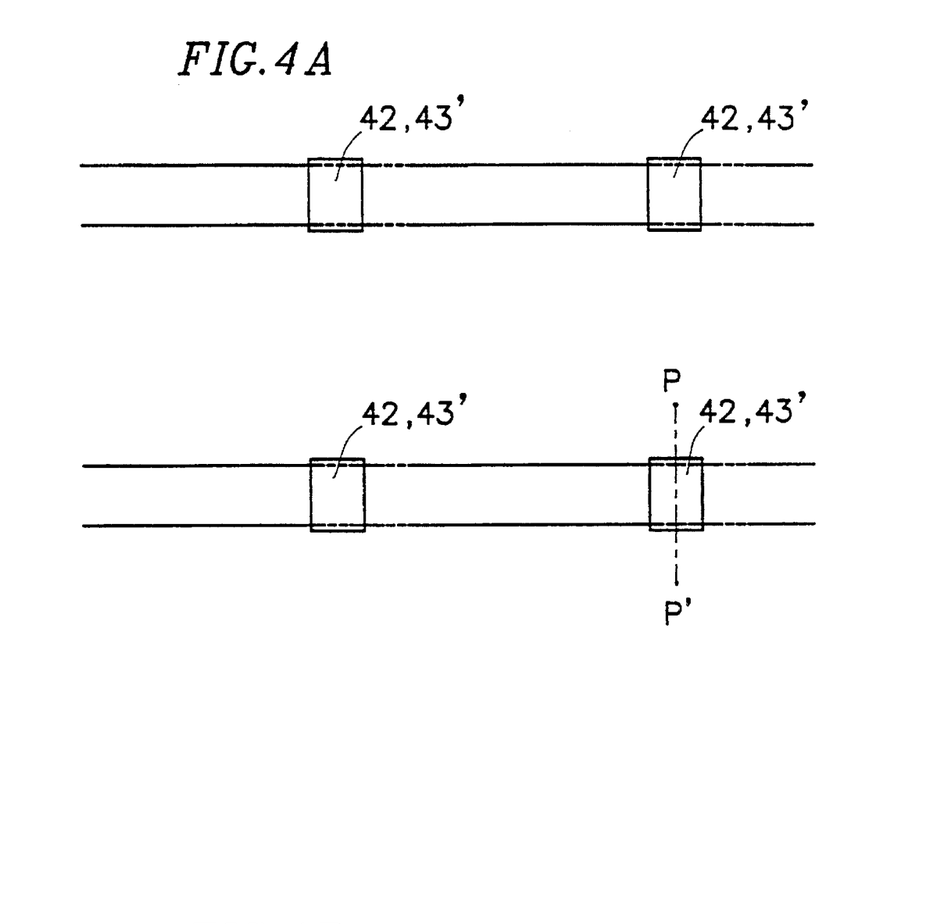
FIG. 4A shows plane views illustrating a fabrication step of the reflective type display apparatus of Example 1.
Figure 4B:
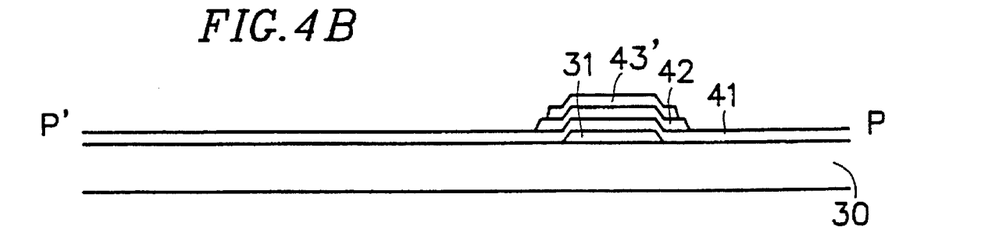
FIG. 4B shows a cross sectional view taken along line P–P' in FIG. 4A.

Then, the gate insulating film 41 made of silicon nitride or the like, a non-doped amorphous silicon film 42, and an $n^+$ amorphous silicon film are formed in this order by a plasma CVD method, as shown in FIGS. 4A and 4B. The $n^+$ amorphous silicon film is patterned into the amorphous silicon layers 42 and 43'.

Figure 5A:
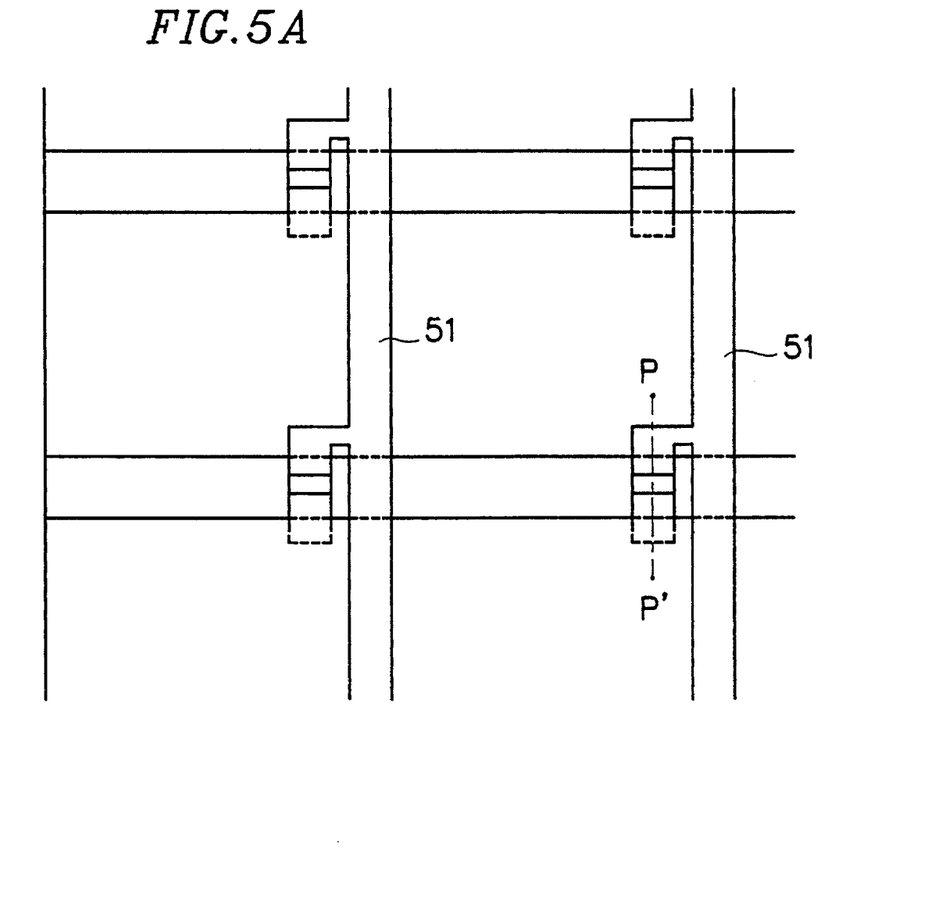
FIG. 5A shows a plane view illustrating a fabrication step of the reflective type display apparatus of Example 1.
Figure 5B:
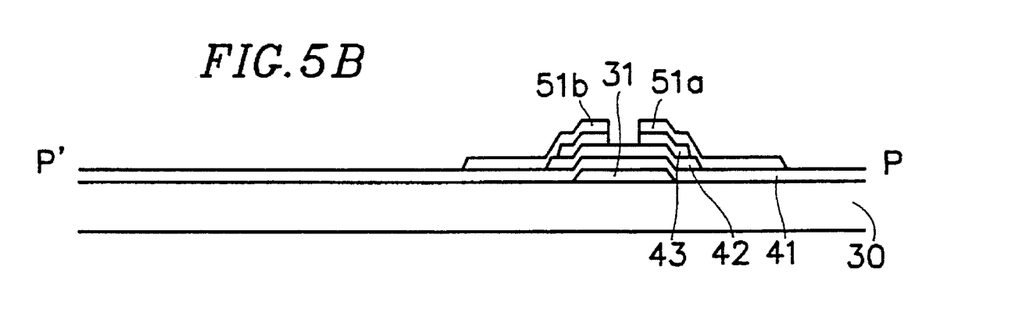
FIG. 5B shows a cross sectional view taken along line P–P' in FIG. 5A.

A titanium thin film is formed by a sputter method, and patterned together with the n⁺ amorphous silicon layer 43' to form the contact layers 43, the signal electrode lines 51, the source electrodes 51a, and the drain electrodes 51b, as shown in FIGS. 5A and 5B.

Figure 6A:
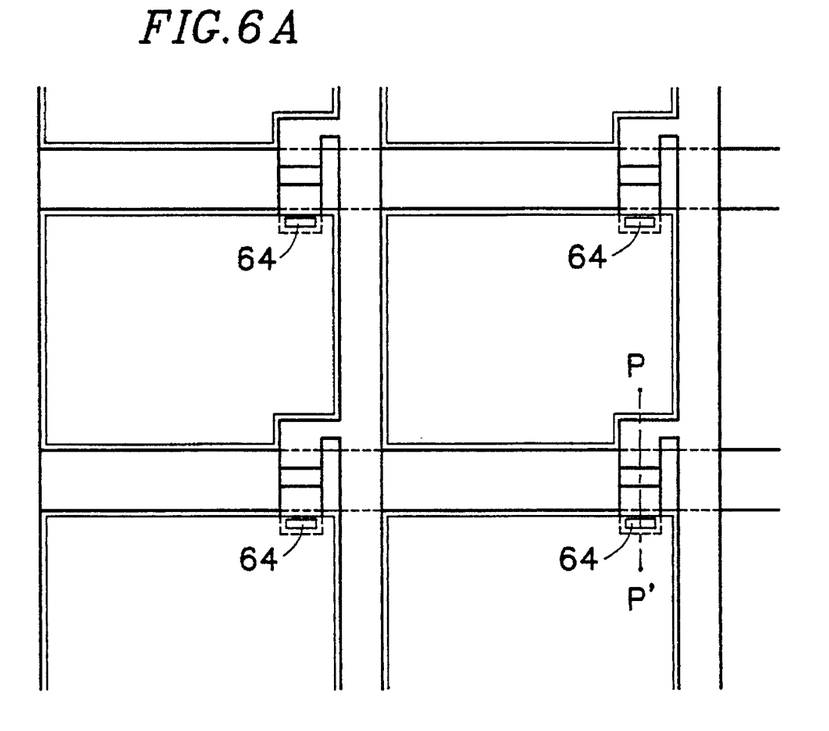
FIG. 6A shows a plane view illustrating a fabrication step of the reflective type display apparatus of Example 1.
Figure 6B:
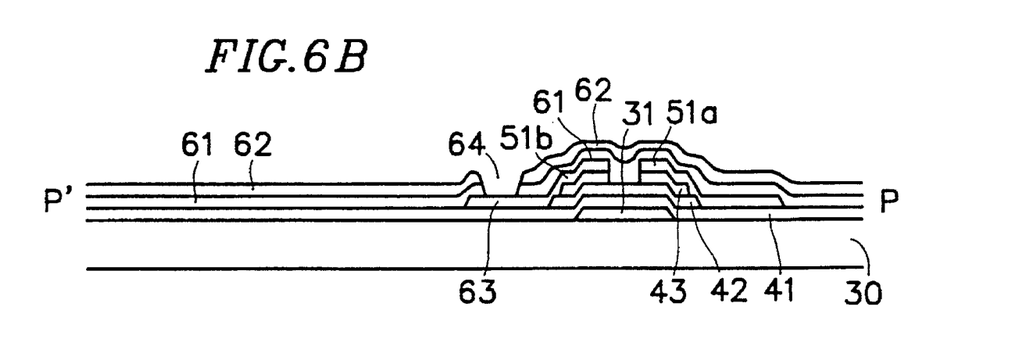
FIG. 6B shows a cross sectional view taken along line P–P' in FIG. 6A.

Next, as shown in FIG. 6B, a silicon nitride film is deposited to form the passivation film 61 by a plasma CVD method. A coating material is prepared by mixing acrylic resin as a matrix and titanium oxide particles having a diameter of 0.1 μm in a weight ratio of 1 to 10, and dissolving them in a methyl ethyl ketone solvent. The coating material is applied by a spin coating so as to have a thickness of 1 μm. The resulting substrate is baked at 150° C. to form a light scattering layer 62 from the coating material. The light scattering layer 62 has a structure in which the titanium oxide particles are dispersed in the matrix made of the acrylic resin. The light scattering layer 62 has a thickness of about 1 μm, for instance.

As shown in FIGS. 6A and 6B, the contact hole 64 is formed through the passivation film 61 and the light scattering layer 62. At this contact hole etching step, the peripheral portions of the passivation film 61 and the light scattering layer 62 which cover terminals of the signal electrode lines 51 are removed simultaneously.

The ITO film is formed by a sputtering method, and patterned to form the pixel electrodes 11, as shown in FIG. 1. The TFT substrate (the first substrate) is accordingly obtained.

Another ITO film is formed on a glass substrate by a sputtering method to form the counter electrode. The substrate is used as the counter substrate (the second substrate).

Alignment films for obtaining homeotropic alignment are applied on the surfaces, where the electrodes are formed, of the TFT and counter substrates, respectively. These substrates are positioned face to face with both alignment films inside and plastic balls interposed therebetween. The substrates are pasted together with a sealing resin. Then, a liquid crystal material containing dichroic dyes and an optically active substance having a chiral center is introduced between the substrates from an opening which was made previously by opening a portion of the sealing resin. Then, the opening is closed. A White-Taylor type guest-host mode display apparatus (e.g., *Liquid Crystal Device Handbook*, Japan Society for the Promotion of Science, Committee 142) is accordingly obtained.

This reflective type display apparatus can display images using driving ICs and driving circuits in a similar manner to a general reflective liquid crystal display apparatus. When the liquid crystal layer transmits, halfway transmits, or blocks out light according to electric signals applied to the pixel electrodes through the TFTs, white, gray, or black display is performed, respectively. The white display does not glare in the display apparatus.

In Example 1, when the specific resistance of the light scattering layer 62 is high enough, and there is no elution of impurity or the like, the passivation film 61 may be omitted.

A reflector made of a metal, such as aluminum, may be formed under the pixel electrode 11 between the light scattering layer 62 and the glass substrate 30.

EXAMPLE 2

In this example, a color display apparatus is constructed by dyeing the light scattering layer in trichromatic colors: red (R); green (G); and blue (B), by employing color fine particles. Other configurations are similar to those of Example 1.

The fabrication process steps of the reflective type display apparatus are as follows. As with Example 1, TFTs are formed on a first substrate and a passivation film is formed.

Figure 2:
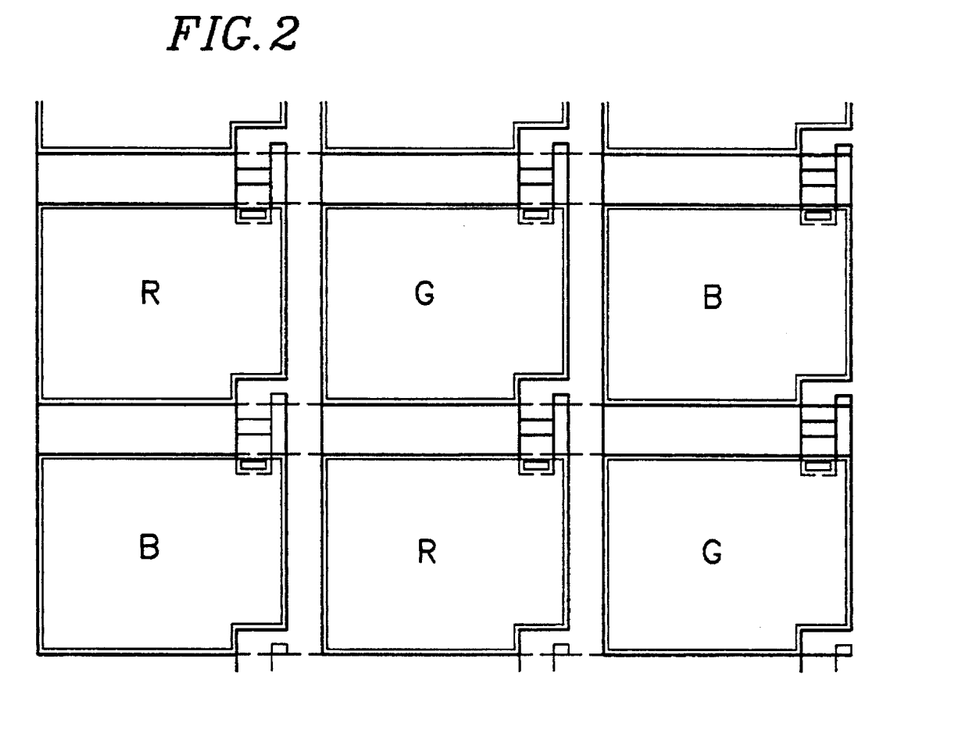
FIG. 2 shows a plane view of a color display apparatus of Example 2.

Then, acrylic resin as a matrix and titanium oxide particles having a diameter of 0.1 μm are mixed in a weight ratio of 1 to 10, and iron oxide red is added as a pigment in a weight ratio of 10 to 1. The mixture is dissolved in a methyl ethyl ketone solvent to prepare a coating material. A film is formed in the same manner as in Example 1, and a red light scattering layer is accordingly obtained. The three pixels shown in FIG. 2 are used as a repeated unit. When a contact hole is formed through the passivation film and the light scattering layer, the light scattering layer is patterned so as to leave only the first pixel portions. Then, a green light scattering layer is formed using a coating material containing chrome green as a green pigment instead of the above-described red pigment. In the same manner as described above, the light scattering layer is patterned so as to leave only the second pixel portions. Finally, a blue light scattering layer is formed using a coating material containing ultramarine as a blue pigment instead of the above-described red pigment. Then, the light scattering layer is patterned so as to leave only the third pixel portions in the repeated unit of three pixels. Following to this, the pixel electrodes of ITO are formed, and arrays of a repetition of the light scattering layers dyed in red (R), green (G), and blue (B) as shown in FIG. 2 are obtained.

Using the same steps as in Example 1, the reflective type display apparatus of Example 2 can be obtained. In this reflective type display apparatus, light is transmitted, halfway transmitted, or blocked out by the liquid crystal layer according to electric signals applied to the pixel electrodes through the TFTs. According to this operation of the liquid crystal layer, the colors in the light scattering layer are displayed, halfway displayed, or not displayed at all, respectively. Color and a non-glaring white display can be obtained.

For dyeing the light scattering layer in Example 2, color fine particles or a dyed matrix may be used.

EXAMPLE 3

In this example, the light scattering layer contains electrically conductive fine particles, and is conductive. The light scattering layer is used as a pixel electrode. The other configurations are similar to those in Example 1.

Figure 7A:
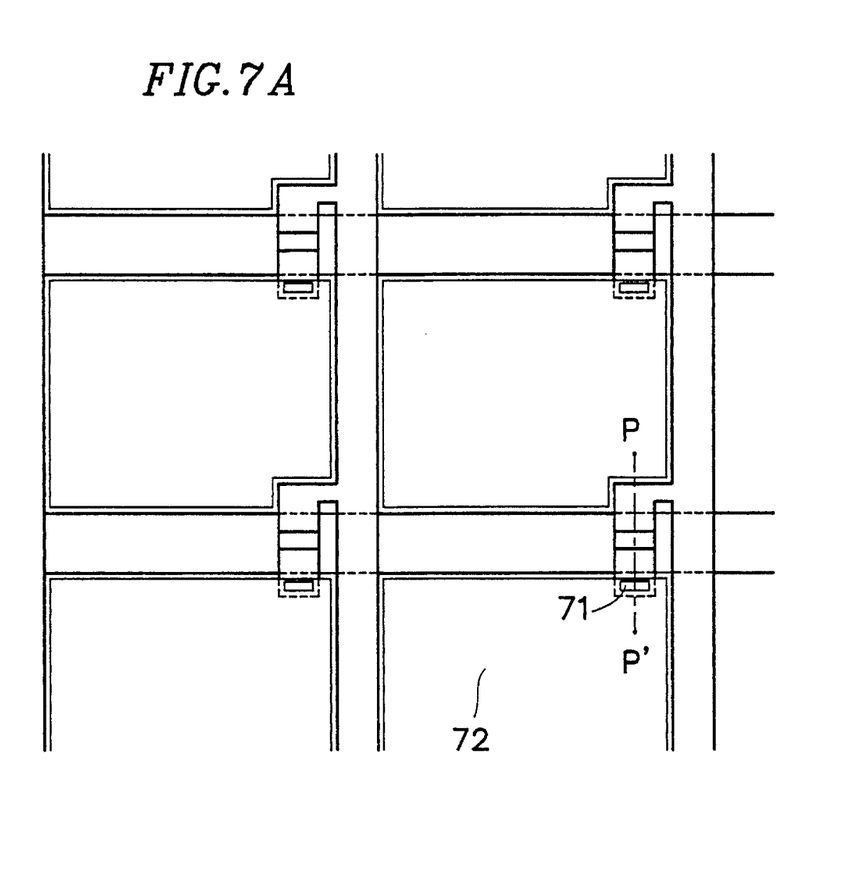
FIG. 7A shows a plane view illustrating a fabrication step of the reflective type display apparatus of Example 3.
Figure 7B:
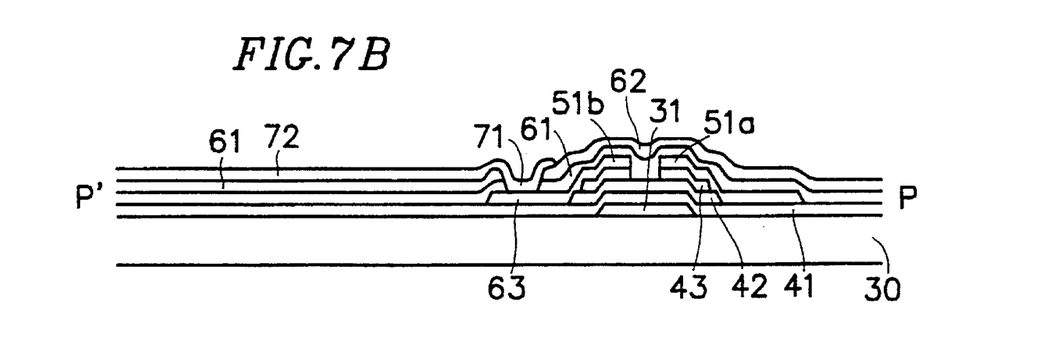
FIG. 7B shows a cross sectional view taken along line P–P' in FIG. 7A.

The fabrication steps of the reflective type display apparatus mentioned above are as follows. As with Example 1, TFTs are formed on the first substrate. Then, as shown in FIG. 7, a passivation film 61 and a contact hole 71 are formed.

Next, acrylic resin as a matrix and titanium oxide particles having a diameter of 0.1 μm are mixed in a weight ratio of 1 to 10. To this mixture, silver particles, as a conductive particle, are added in a weight ratio of 1 to 1. The resulting mixture is dissolved in a methyl ethyl ketone solvent to prepare a coating material, and a film is formed in the same manner as in Example 1. The film is patterned as shown in FIG. 7 to form conductive light scattering layers 72. Each of the light scattering layers 72 serve as a pixel electrode.

Then, using similar steps to those in Example 1, a reflective type display apparatus of this example can be fabricated. In the reflective type display apparatus, the liquid crystal layer transmits, halfway transmits, or blocks out light according to electric signals applied to the light scattering layer (pixel electrodes) through TFTs. In accordance with this operation of the liquid crystal layer, a white, gray, or black display is obtained, respectively. The white display does not glare in the display apparatus.

Although titanium oxide is used as a fine particle contained in the light scattering layers in Examples 1, 2, and 3, an oxide, such as aluminum oxide, silicon oxide, manganese oxide, zirconium oxide, or zinc oxide, or a fluoride, such as magnesium fluoride or fluorite, may be used.

For the matrix of the light scattering layers, a polymer, such as polyamide, polyimide, polyester, epoxy resin, or polyvinylalcohol may be used in addition to acrylic resin.

The present invention is applicable to an active matrix type liquid crystal display in which a TFT, an MIM (Metal Insulator Metal), a diode, a varistor, or the like is used as a switching element, and to a simple multiplexed type liquid crystal display.

Film thickness is designed depending on the kind of dispersed materials. It is preferable that the thickness of the light scattering layer is in the range from 1000 angstroms to 10 μm. According to thin film formation techniques, it is difficult to make a film of thickness equal to or larger than 10 μm. In addition, the transparency of a film is not too high in the range of thicknesses equal to or larger than 1000 angstroms.

As described hereinbefore, a reflective type liquid crystal apparatus capable of performing multicolor display, and a non-glaring white display is provided. The reflective type display apparatus is produced economically in simple fabrication steps.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective type display apparatus having a plurality of pixels, comprising:

a first substrate;

a second substrate provided in parallel to the first substrate, the second substrate being transparent to external light;

a plurality of transparent pixel electrodes formed on the first substrate;

a transparent counter electrode layer formed on the second substrate;

a light modulating layer for modulating the external light in accordance with voltages between the plurality of transparent pixel electrodes and the transparent counter electrode, the light modulating layer being interposed between the plurality of transparent pixel electrodes and the transparent counter electrode; and a light scattering layer in which fine particles are dispersed in a matrix made of a resin, said light scattering layer being interposed between the plurality of transparent pixel electrodes and the first substrate, the light scattering layer diffusely scatters the external light, thereby reducing glare.

2. A reflective type display apparatus according to claim 1, wherein the light scattering layer is colored for each of the plurality of pixels.

3. A reflective type display apparatus according to claim 2, wherein each of colored regions of the light scattering layer includes red regions, green regions or blue regions, and the red regions, the green regions and the blue regions are arranged regularly.

4. A reflective type display apparatus according to claim 1, wherein each of the fine particles is made of material selected from a group of aluminum oxide, silicon oxide, titanium oxide, manganese oxide, zirconium oxide, zinc oxide, magnesium fluoride and fluorite.

5. A reflective type display apparatus according to claim 1, wherein the matrix of the light scattering layer includes a polymer selected from a group of polyamide, polyimide, polyester, acrylic resin, epoxy resin, and polyvinylalcohol.

6. A reflective type display apparatus according to claim 1, wherein the thickness of the light scattering layer is in a range from 1000 angstroms to 10 μm.

7. A reflective type display apparatus according to claim 1, further comprising a metal reflector layer between the light scattering layer and the first substrate.

8. A reflective type display apparatus according to claim 1, wherein the light scattering layer includes at least one of dyed fine particles as the fine particles and a dyed matrix as the matrix.

9. A reflective type display apparatus according to claim 1, wherein the light modulating layer includes a liquid crystal containing dichroic pigments.

10. A reflective type display apparatus having a plurality of pixels, comprising:

a first substrate;

a second substrate provided in parallel to the first substrate, the second substrate being transparent to external light;

a plurality of pixel electrodes formed on the first substrate;

a transparent counter electrode layer formed on the second substrate; and a light modulating layer for modulating the external light in accordance with voltages between the plurality of pixel electrodes and the transparent counter electrode, the light modulating layer being interposed between the plurality of pixel electrodes and the transparent counter electrode;

wherein each of the plurality of pixel electrodes includes a light scattering layer in which fine particles are dispersed in a matrix made of a resin, the light scattering layer diffusely scatters the external light, thereby reducing glare, and wherein the fine particles include electrical conductive particles.

11. A reflective type display apparatus according to claim 10, wherein the light scattering layer is colored for each of the plurality of pixels.

12. A reflective type display apparatus according to claim 11, wherein each of the colored regions of the light scattering layer includes red regions, green regions or blue regions, and the red regions, the green regions and the blue regions are arranged regularly.

13. A reflective type display apparatus according to claim 10, wherein each of the fine particles is made of material selected from a group of aluminum oxide, silicon oxide, titanium oxide, manganese oxide, zirconium oxide, zinc oxide, magnesium fluoride and fluorite.

14. A reflective type display apparatus according to claim 10, wherein the matrix of the light scattering layer includes a polymer selected from a group of polyamide, polyimide, polyester, acrylic resin, epoxy resin, and polyvinylalcohol.

15. A reflective type display apparatus according to claim 10, wherein the thickness of the light scattering layer is in a range from 1000 angstroms to 10 μm.

16. A reflective type display apparatus according to claim 10, further comprising a metal reflector layer between the light scattering layer and the first substrate.

17. A reflective type display apparatus according to claim 10, wherein the light scattering layer is dyed by dyeing at least one of the fine particles and the matrix of the light scattering layer.

18. A reflective type display apparatus according to claim 10, wherein the light modulating layer includes a liquid crystal containing dicroic pigments.

* * * * *